United States Patent [19]

Roerig et al.

[11] Patent Number: 5,018,402
[45] Date of Patent: May 28, 1991

[54] PLANETARY GEAR DRIVE FOR CONTROLLED DEFECTION ROLLS

[75] Inventors: Arnold J. Roerig, Beloit; Steven C. Shockley, Clinton, both of Wis.

[73] Assignee: Beloit Corporation, Beloit, Wis.

[21] Appl. No.: 338,685

[22] Filed: Apr. 17, 1989

[51] Int. Cl.⁵ .............................................. F16H 57/00
[52] U.S. Cl. ................................. 475/347; 74/421 R; 74/410; 384/558; 384/569
[58] Field of Search ...................... 74/421 R, 458, 789, 74/792, 410; 384/192, 495, 558, 517, 563, 569

[56] References Cited

U.S. PATENT DOCUMENTS

| | | | |
|---|---|---|---|
| 2,516,077 | 7/1950 | Schmitter | 74/410 |
| 2,654,267 | 10/1953 | Schmitter | 74/410 X |
| 2,982,144 | 5/1961 | Wallgren | 74/410 |
| 3,167,967 | 2/1965 | Silberger | 74/421 R X |
| 3,290,897 | 12/1966 | Kuehn | 29/115 X |
| 3,419,890 | 12/1968 | Justus | 29/115 |
| 3,590,652 | 7/1971 | Strang | 74/421 R |
| 3,639,956 | 2/1972 | Justus | 29/115 X |
| 3,839,922 | 10/1974 | Hiersig et al. | 74/410 |
| 3,855,681 | 12/1974 | Andriola et al. | 29/115 |
| 3,897,985 | 8/1975 | Davis et al. | 385/495 |
| 3,951,481 | 4/1976 | Ritter, Jr. | 385/563 |
| 4,065,981 | 1/1978 | Whateley et al. | 74/410 |
| 4,106,366 | 8/1978 | Altenbokum et al. | 74/410 X |
| 4,271,574 | 6/1981 | Matikainen | 74/410 X |
| 4,342,488 | 8/1982 | Anderson et al. | 384/192 |
| 4,352,228 | 10/1982 | Iso-Aho | 29/115 |
| 4,402,233 | 9/1983 | Toivonen et al. | 29/115 X |
| 4,510,823 | 4/1985 | Leech | 74/789 |
| 4,676,117 | 6/1987 | Schiel | 74/421 R |
| 4,829,842 | 5/1989 | Schiel | 74/421 R |
| 4,867,581 | 9/1989 | Schmidt et al. | 384/517 |

Primary Examiner—Mark Rosenbaum
Assistant Examiner—Frances Chin
Attorney, Agent, or Firm—Dirk J. Veneman; Raymond W. Campbell; Gerald A. Mathews

[57] ABSTRACT

A drive mechanism for a paper machine controlled deflection roll or the like having a tubular roll shell driven by a ring gear with driving pinions driving the ring gear and each of the pinions mounted on support shafts with the support shafts carrying planetary gears driven by a sun gear. The sun gear is carried on a power input shaft mounted in vertical slides. The planetary gears are horizontal of the sun gear so that the sun gear can shift and be self-positionable to equalize the load on the gear teeth as the sun gear drives the planetary gears with a thrust bearing on the shaft and helical teeth between the sun gear and the planetary gears.

2 Claims, 2 Drawing Sheets

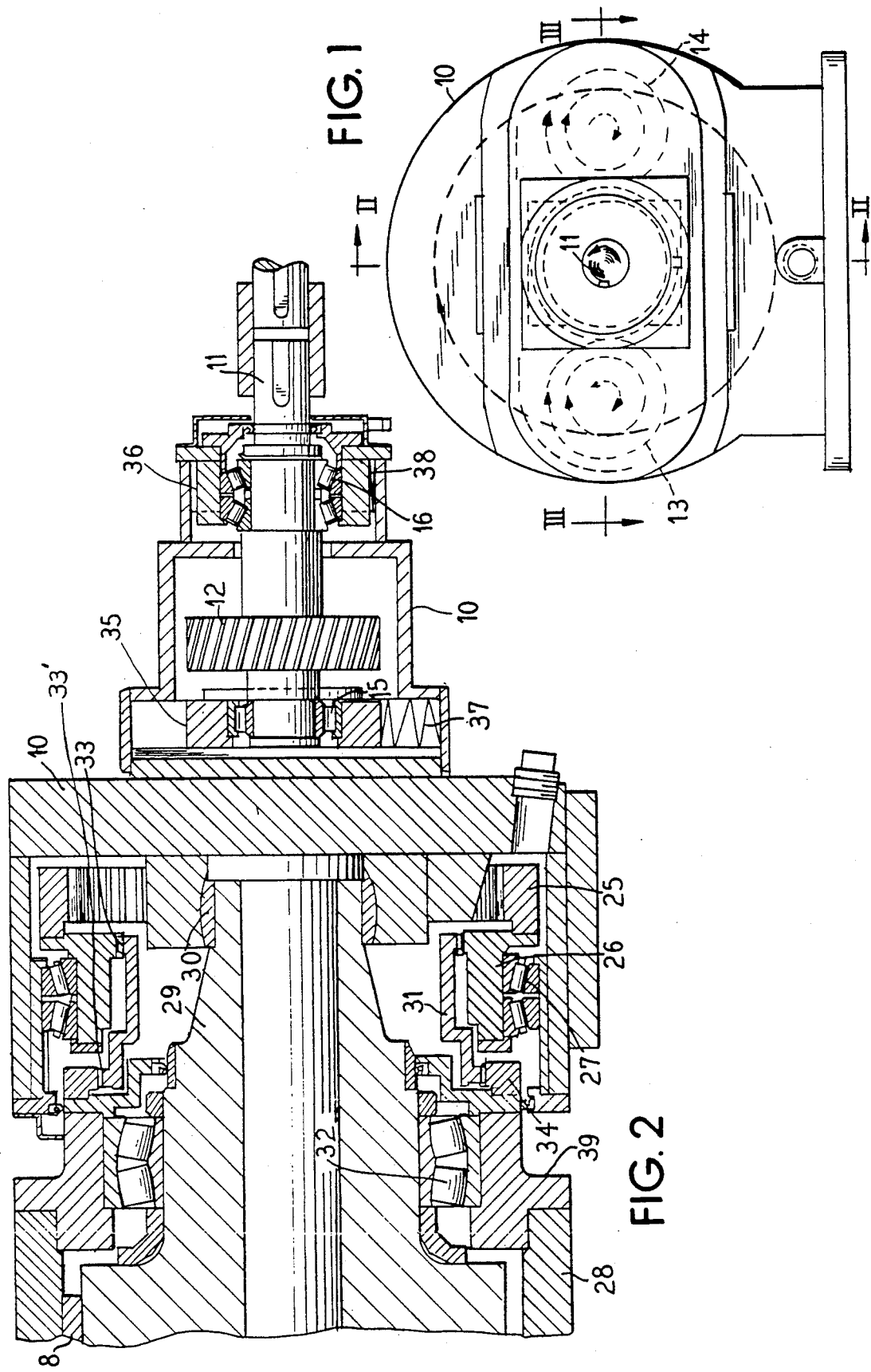

PLANETARY GEAR DRIVE FOR CONTROLLED DEFECTION ROLLS

BACKGROUND OF THE INVENTION

The present invention relates to improvements in drives such as for controlled deflection rolls for papermaking machines or the like, and more particularly to an improved controlled crown roll drive where the input power is coaxial with the roll shell through a planetary gearing.

Controlled deflection rolls are used commercially in various environments such as in papermaking machines, textile machines and other industries where a long roll has to sustain a load and have a controlled deflection. One area of use is in a papermaking machine wherein such a roll may be used in a calender stack or press section and forms a paper web processing nip with another roll. The controlled deflection roll is operated so that it maintains a nip of uniform or controlled nonuniform pressure along its nip formed with another roll. Such controlled deflection rolls commonly have a roll shell which is rotatable on a stationary shaft and a fluid force transmitting means is located between the roll shell and shaft so that the shell is supported uniformly along its length by the fluid force transmitting means. In control of the deflection of the roll, the pressure in the fluid is controlled to match the opposing roll to obtain the desired nip force per unit of roll shell length between the controlled deflection roll and the opposing roll. An example of such a roll is in the Justus U.S. Pat. No. 3,276,102.

In such controlled deflection rolls, the roll shell often must be driven to carry the material being processed through the nip. In driving such commercial rolls, high horsepower requirements are encountered and these driving forces must be transmitted from a drive to a roll shell which bends in varying amounts during operation thereby tending to misalign the drive which cannot be tolerated at high drive loads. Means have been provided heretofore to accommodate such bending, but these structures have often been complex and space consuming.

With the horsepower requirements for huge papermaking machines, the use of planetary gearings is advantageous in such gearings' capability of carrying high horsepower loads. Another requirement for a drive is that it require a minimum amount of space, and in papermaking machines with a large number of drives with the various sections of the machine, a drive which is coaxial with the roll is advantageous.

Various attempts at improved drives have been made, and examples of drives for controlled crown rolls of papermaking machines are shown in U.S. Pat. Nos. 3,639,956, 3,766,620 and 3,889,334.

An object of the invention is to provide an improved drive for a paper machine controlled deflection roll or the like utilizing planetary gearing wherein the loads between the sun gear and the planetary gears are automatically equalized to accommodate misalignment or imperfections in manufacturing.

A further object of the invention is to provide an improved drive for a roll wherein the drive requires less space and can be located coaxial with the roll.

A further advantage of the invention is to provide an overall improved drive for a roll shell capable of handling substantially large power inputs.

FEATURES OF THE INVENTION

In accordance with the invention, a roll shell such as for a controlled deflection roll is driven by a planetary gearing which can be mounted coaxial with the roll. The planetary gearing is arranged with the sun gear floating in slide blocks so that it is self-positioning to seek its own position in the plane of the planetary gears to equalize the power transfer forces between the planetary gear teeth on either side of the sun gear, thereby eliminating the possibility of unequal loads which might be caused by nonuniform manufacturing.

The planetary gearing is arranged with simplified relatively inexpensive helical teeth, and the arrangement is such that it accommodates the location of thrust bearings to support the axial thrust caused by the helical teeth.

In the arrangement, the driven member, such as the controlled crown roll shell, is supported to rotate about the same axis as the sun gear. The roll shell of the controlled crown roll is driven by a ring gear and the sun gear is coaxial with the ring gear but axially offset therefrom. The sun gear shaft is mounted on two sets of bearings, one being a straight roller bearing and the other being a thrust bearing such as a tapered roller bearing. The sun gear bearings are mounted in slide blocks which initially locate the axis of rotation of the sun gear in the plane of the axes of rotation of the planetary gears. Corresponding points on the sun and planetary gears then rotate in a plane which is perpendicular to the plane of their axes of rotation. The slide blocks permit the axis of the sun gear shaft to translate relative to the plane of the axes of revolution of the planetary gears. This allows the sun gear to seek its own position relative to the planetary gears according to the forces they apply to either side of the sun gear.

Other objects, advantages and features will become more apparent with the teaching of the principles of the invention in connection with the disclosure of the preferred embodiments in the specification, claims and drawings, in which:

DESCRIPTION OF THE DRAWINGS

FIG. 1 is an end elevational view of a gear drive arrangement constructed in accordance with the principles of the present invention;

FIG. 2 is a vertical sectional view taken substantially along line II—II of FIG. 1;

DESCRIPTION OF THE PREFERRED EMBODIMENTS

Figure 3:
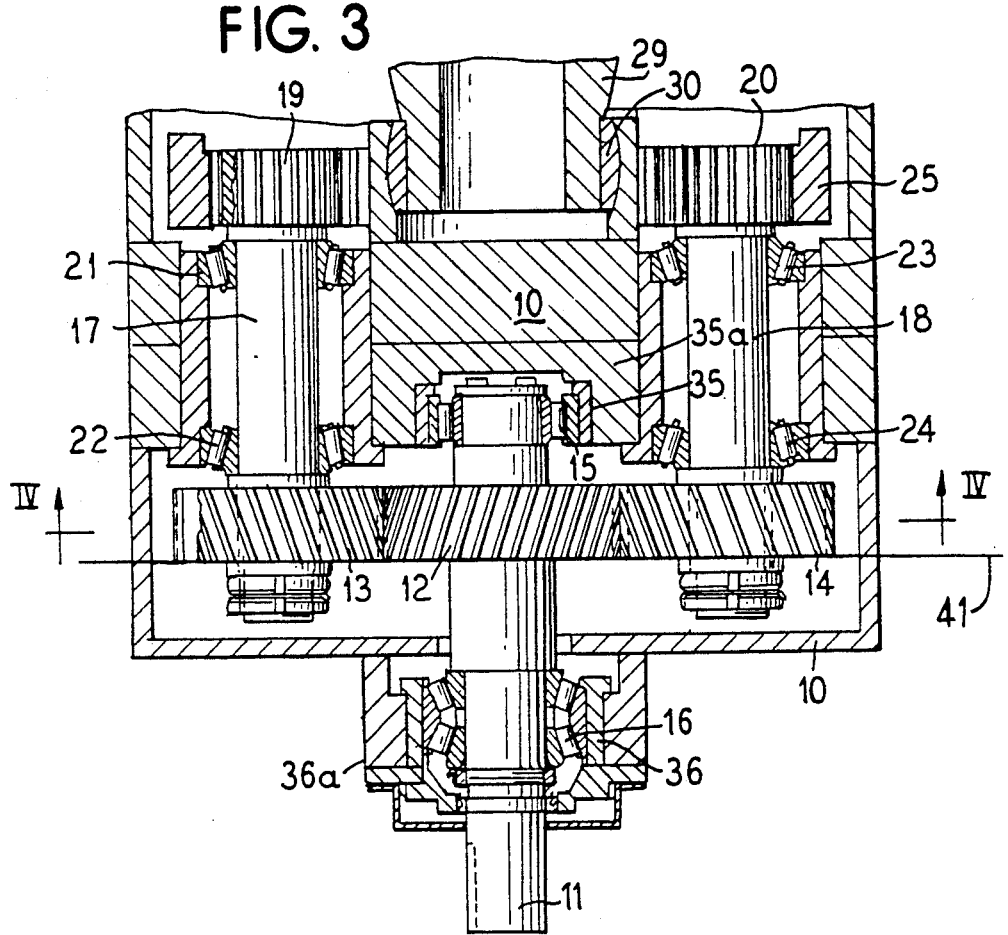
FIG. 3 is a horizontal sectional view taken substantially along line III—III of FIG. 1.

As illustrated in the drawings, the drive mechanism for a roll shell is supported in a housing stand 10. A similar stand is provided at the other end, not providing the drive but providing a rotary support for a roll shell 28.

The input rotary power for driving the roll shell is delivered through an input shaft 11. Mounted on the input shaft is a sun gear 12 shown as having helical gear teeth provided therein. Spaced laterally of input shaft 11 and sun gear 12 are parallel support shafts 17,18 on which planetary gears 13 and 14 are mounted, respectively, and which are also provided with mating helical gear teeth to mesh with the sun gear and to be driven thereby.

The sun gear is carried on the power input shaft 11 which is rotatably supported in end bearings 15 and 16. The bearing 15 is a straight roller bearing, whereas the bearing 16 is a thrust bearing to take the axial thrust on the sun gear caused by the reaction of the helical gear teeth with the planetary gears 13 and 14.

The planetary gears 13 and 14 are supported on support shafts 17 and 18. These support shafts are mounted in roller bearings 21 and 22 for the shaft 17 and 23 and 24 for the shaft 18, and all of the bearings are supported in the frame stand 10.

The planetary gears 13 and 14 are carried at one end of the support shafts 17 and 18 and at the other end are pinions 19 and 20, respectively. The pinions are in driving mesh with a ring gear 25. The ring gear is substantially coaxial with the power input shaft 11 and with the sun gear 12.

The ring gear has an annular collar 26 supported in roller bearings 27 for rotatably supporting the ring gear in frame stand 10.

Between the collar 26 and the tubular roll shell 28 is a torque transferring sleeve 31 which has a toothed, or splined, connection 33, 33' at either end thereof between collar 26 and ring 34 attached to the end of the roll shell. The roll shell is rotatably supported about a support shaft 29 in self-aligning bearings 32 through an annular end flange 39.

Support shaft 29 is stationary and extends through the roll shell from one end to the other. The shaft is supported at its ends on self-aligning bushings 30 which are suitably mounted in the frame stand. Suitable deflection control means 8 are provided along the stationary shaft 29 to bear against the inner surface of the roll shell 28 to control its deflection. The force means which transfer a deflection control force from the shaft 29 to the roll shell 28 may be in the form of a sliding shoe or a liquid pocket in the manner that is well-known to those versed in the art. The support bearing arrangement with self-aligning bearings 32 allows for bending of the roll shell and the drive sleeve 31 through toothed connection 33 allows also for this bending about an axis transverse to the longitudinal axis of the roll but this arrangement permits the rotary drive power to be continued to be transmitted to the roll shell even with bending.

In operation, power input is received through the shaft 11 to rotate the sun gear 12 and drive the two planetary gears 13 and 14 in rotation. They in turn drive the pinions 19 and 20 in rotation through shafts 17,18 to rotate the ring gear 25 which in turn drives the roll shell 28 in rotation through collar 26, sleeve 31 and ring 34.

As in all intricate mechanical apparatus, misalignment and deviations in the correct location of the various component parts can occur. This is especially critical in apparatus having moving parts. In this apparatus, stress between the sun gear 12 on input shaft 11 and planetary gears 13,14 on support shafts 17,18 can arise when the manufacturing deviations, due to failure to maintain sufficient tooth or bearing center tolerances, produce interference between parts. If the positions of the shafts 11 for the sun gear, and 17 and 18 for the planetary gears, are fixed, the result can be an unequal power transmission from the sun gear to the planetary gears. For example, if the teeth of the gear 13 are in positive mesh with the sun gear, but the teeth of the planetary gear 14 are not in positive mesh due to misalignment or loose tolerances, more power will be transmitted through the planetary gear 13, its shaft 17 and its pinion 19 than through the other planetary gear 14. This reduces the efficiency or effectiveness of the gear arrangement because the tooth construction and gear construction will have to be designed to be heavier to carry more than one-half the power input at such times when unequal power is transmitted through one planetary gear or the other.

Figure 4:
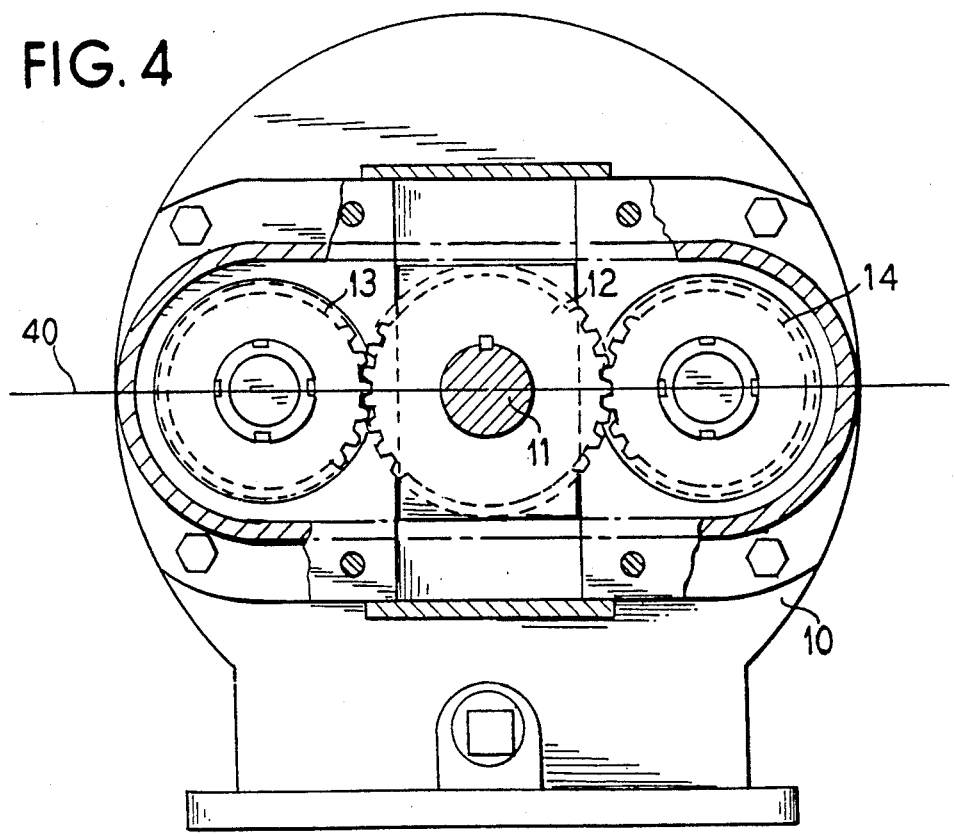
FIG. 4 is a vertical sectional view taken substantially along line IV—IV of FIG. 3.

To compensate for the possibility of uneven power transmission, shaft 11 is mounted on a pair of slide supports 35,36 in such a manner so that the shaft floats vertically, or normal to the plane 40 of the axes of revolution of the sun and planetary gears (FIG. 4) and is self-positioning. While the planetary gears are shown horizontal of the sun gear 12 in FIGS. 1 and 4, it will be understood that the relative position is not limiting and reference to the planetary gears as being horizontally aligned and the sun gear being vertically movable is for convenience of description only and the gear structure is not limited to the exact position shown in the drawings. Basically, the sun gear is allowed to float and seek its own position in a plane 41 parallel through the gears which is at right angles to the gear shafts 11, 17 and 18.

Stated another way, support shafts 17,18, on which the planetary gears 13,14 are mounted, have axes of revolution which are in a plane. Under ideal conditions, a plane containing the axis of revolution of input shaft 11 is coincident with the plane of the axes of revolution of shafts 17,18. The forces of power transmission between the meshing teeth of the sun and planetary gears are acting in a plane perpendicular to the plane of the axes of revolution of the support shafts.

When the sun gear floats, the plane of the axis of revolution of the input shaft moves translationally upward or downward relative to the plane of the support shafts. Accordingly, the forces of power transmission between the sun and planetary gears may not be precisely parallel but are substantially parallel and are considered parallel for the purposes of describing the relationship of the component parts, and operation, of this invention.

The shaft 11 carrying the sun gear 12 is mounted for translational movement in vertically slidable supports 35 and 36. Bearing 15 is mounted in a slide support 35 which is constrained to slide vertically in a groove in a mounting track 35a mounted in the frame. Bearing 16 is mounted in a slide support 36 which is constrained to slide vertically in a mounting track 36a mounted in the frame. This allows the drive shaft 11, which is rotatably supported in bearings 15,16 mounted in slide supports 35,36, respectively, to shift vertically so that the sun gear 12 will automatically move to its neutral position wherein the forces between its teeth and the teeth of each of the planetary gears 13 and 14 are equal so that an equal amount of power is transmitted through each of the gear trains of each of the planetary gears and pinions.

The weight of the sun gear assembly can be neutralized by using springs under the slide supports. This is illustrated by the spring 37 under the slide support 35 and by the spring 38 under the slide support 36. Various types and forms of spring may be used to support the weight of sun gear 12, its shaft bearings, and slide supports. The sun gear then will respond fully only to the forces between the gear teeth to seek its own position in a plane parallel to the tangential gear forces.

While other forms of gear teeth may be employed, helical gear teeth are inexpensive and well suited for transferring large torques. This arrangement allows for the provision of a thrust bearing 16 to accommodate the axial thrusts on the sun gear 12. Axial thrusts on the planetary gears are accommodated by the bearings 21,22,23,24 for the shafts 17 and 18. The pinions 19 and 20 and the ring gear 25 are shown with straight spur teeth, but other forms of teeth may be employed.

The drive arrangement is substantially coaxial with the power input shaft 11 which is coaxial with the ring gear 25 and with the tubular roll shell 28, taking into consideration the occasional slight offset due to the floating, translational movement of the sun gear, thus requiring a minimum amount of space in the machine. This is important in an installation such as in a papermaking machine wherein the drive must be in the aisle at the side of the machine and with the substantial amount of power required, gears which are capable of carrying high horsepower loads are necessary. The drive arrangement of this invention provides an axially aligned drive which is capable of transmitting high torque and is also compact.

Thus, it will be seen that we have provided an arrangement which meets the objectives and advantages above set forth and which is relatively less expensive to manufacture and is accessible for maintenance and servicing.

We claim as our Invention:

1. A drive mechanism for a paper machine controlled deflection roll comprising in combination:

a power input shaft rotatably mounted;

a sun gear driven by said shaft;

planetary driven gears in driven mesh with the sun gear located on opposite lateral sides of the sun gear whereby driving forces are transmitted from the sun gear to the planetary gears at the location of mesh;

an output drive mechanism driven by the planetary gears;

and a movable supporting mount for the power input shaft yieldable parallel to the direction of the driving forces between the sun and planetary gears whereby the sun gear is allowed to seek its own position in the plane of the gears to equalize the driving forces between the sun gear and each of the planetary gears;

wherein the sun gear is mounted on the power input shaft with bearings and the movable supporting mount is in the form of slidable slide supports supporting the shaft and guiding the shaft and sun gear in said mount substantially normal to the plane of the axes of revolution of the sun and planetary gears.

2. A drive mechanism for a paper machine controlled deflection roll comprising in combination:

a power input shaft rotatably mounted;

a sun gear driven by said shaft;

planetary driven gears in driven mesh with the sun gear located on opposite lateral sides of the sun gear whereby driving forces are transmitted from the sun gear to the planetary gears at the location of mesh;

an output drive mechanism driven by the planetary gears;

a movable supporting mount for the power input shaft yieldable parallel to the direction of the driving forces between the sun and planetary gears whereby the sun gear is allowed to seek its own position in the plane of the gears to equalize the driving forces between the sun gear and each of the planetary gears;

wherein the sun gear is mounted on the power input shaft with bearings and the movable supporting mount is in the form of slidable slide supports supporting the shaft and guiding the shaft and sun gear in said mount substantially normal to the plane of the axes of revolution of the sun and planetary gears;

wherein the driven gear are horizontal of the sun gear, and the path of the slidable supports is vertical, and the mechanism includes a spring support resiliently applying a vertical force carrying the weight of the sun gear shaft, bearings and slide supports.

* * * * *